(12) United States Patent
Heller

(10) Patent No.: US 10,472,052 B2
(45) Date of Patent: Nov. 12, 2019

(54) FLOW BODY FOR AN AIRCRAFT FOR PASSIVE BOUNDARY LAYER SUCTION

(71) Applicant: Airbus Operations GmbH, Hamburg (DE)

(72) Inventor: Gerd Heller, Hamburg (DE)

(73) Assignee: Airbus Operations GmbH (DE)

( * ) Notice: Subject to any disclaimer, the term of this patent is extended or adjusted under 35 U.S.C. 154(b) by 306 days.

(21) Appl. No.: 15/413,836

(22) Filed: Jan. 24, 2017

(65) Prior Publication Data

US 2017/0217568 A1 Aug. 3, 2017

(30) Foreign Application Priority Data

Jan. 29, 2016 (EP) .................................... 16153298

(51) Int. Cl.
| | |
|---|---|
| *B64C 21/06* | (2006.01) |
| *B64C 5/06* | (2006.01) |
| *B64C 5/02* | (2006.01) |

(52) U.S. Cl.
CPC .............. *B64C 21/06* (2013.01); *B64C 5/02* (2013.01); *B64C 5/06* (2013.01); *B64C 2230/04* (2013.01); *Y02T 50/166* (2013.01)

(58) Field of Classification Search
CPC .. B64C 21/06; B64C 5/02; B64C 5/06; B64C 2230/04; B64C 2230/06; Y02T 50/166
See application file for complete search history.

(56) References Cited

U.S. PATENT DOCUMENTS

| | | | | | |
|---|---|---|---|---|---|
| 2,266,529 | A | * | 12/1941 | Wright .................. | B64C 23/005 244/204 |
| 2,428,585 | A | * | 10/1947 | Rogers .................. | F16L 37/008 114/185 |
| 5,899,416 | A | * | 5/1999 | Meister ................... | B64C 21/06 244/207 |

(Continued)

FOREIGN PATENT DOCUMENTS

| | | |
|---|---|---|
| FR | 3 020 345 A1 | 10/2015 |
| GB | 2 402 196 A | 12/2004 |
| WO | 2015/142480 A1 | 9/2015 |

OTHER PUBLICATIONS

EP 16153298.1 Search Report dated Jul. 12, 2016.

*Primary Examiner* — Medhat Badawi
*Assistant Examiner* — Vicente Rodriguez
(74) *Attorney, Agent, or Firm* — Lerner, David, Littenberg, Krumholz & Mentlik, LLP

(57) ABSTRACT

An aircraft flow body includes a flow surface exposed to an airstream during flight, at least one structural component attached to an interior of the flow surface, at least one perforated area having a plurality of openings extending through the flow surface, a manifold positioned interior to the flow surface in fluid communication with the openings and upstream of the at least one structural component, and at least one suction duct having a first end in communication with the manifold and a second end placed exterior to the flow surface downstream of the structural component. The at least one suction duct includes a suction opening facing away from the first end and adapted for inducing a suction force into the at least one suction duct when the flow surface is exposed to the airstream during flight, thereby inducing a flow of air from through the openings to the suction opening.

15 Claims, 3 Drawing Sheets

(56) References Cited

U.S. PATENT DOCUMENTS

| | | | |
|---|---|---|---|
| 9,701,399 B1* | 7/2017 | Booher, Sr. | B64C 21/06 |
| 2003/0150962 A1* | 8/2003 | Orban | B64C 21/025 |
| | | | 244/209 |
| 2004/0129839 A1* | 7/2004 | Patel | B64C 21/025 |
| | | | 244/204 |
| 2009/0212165 A1 | 8/2009 | Parikh | |
| 2010/0181434 A1 | 7/2010 | Powell et al. | |
| 2010/0181435 A1* | 7/2010 | Sakurai | B64C 21/02 |
| | | | 244/209 |
| 2013/0270390 A1* | 10/2013 | Schrauf | B64C 21/06 |
| | | | 244/91 |
| 2016/0144946 A1 | 5/2016 | Danielou et al. | |

\* cited by examiner

FLOW BODY FOR AN AIRCRAFT FOR PASSIVE BOUNDARY LAYER SUCTION

FIELD OF THE INVENTION

The invention relates to the passive boundary layer suction on a flow body of an aircraft and in particular to a flow body of an aircraft comprising a flow surface exposed to an airstream during flight of the aircraft, at least one perforated area comprising a plurality of openings extending through the flow surface as well as a suction duct for suction of air through the at least one perforated area.

BACKGROUND OF THE INVENTION

Influencing the boundary layer on a flow body, which is exposed to an airflow, supports improving the aerodynamic characteristics of the flow body and, more particularly, supports the reduction of its aerodynamic drag. Generally, the boundary layer control is conducted either through suction, hence enabling extended laminar boundary layers, or through re-energizing the boundary layer by blowing. Besides active systems, which actively move air into or out of the boundary layer by means of pumps or similar devices, also passive systems are known. Both concepts require a suitable perforation in a dedicated area of an exterior flow surface to allow air to pass through the flow surface.

U.S. 2013/0270390 A1 shows an aircraft with a partially perforated outer surface as well as a suction profile body, with which a suction force is generated. By applying the suction force to the perforated surface, air is moved through the perforation and thus removed from the boundary layer.

BRIEF SUMMARY OF THE INVENTION

For providing a passive boundary layer control through suction of air from a flow boundary layer, a pressure differential between the location of the perforation and a second location at or near the flow body may be used. Such a passive suction system needs to fulfil several requirements, which include ensuring the functionality, i.e. providing a sufficient mass flow driven by the pressure differential, minimizing parasitic drag, respecting space constraints interior to the flow surface of the flow body and space allocation requirements, minimizing additional weight and allowing for a maximum suction area and hence laminar flow area. An aspect of the invention may provide an alternate solution for a flow body of an aircraft, which is adapted for conducting a passive suction of air from the boundary layer of the flow body.

A flow body of an aircraft is proposed, the flow body comprising a flow surface exposed to an airflow during flight of the aircraft, at least one structural component attached to an interior of the flow surface, at least one perforated area comprising a plurality of openings extending through the flow surface, a manifold positioned interior to the flow surface in fluid communication with the openings and upstream of the at least one structural component, and at least one suction duct having a first end and a second end, the first end being in fluid communication with the manifold and the second end placed exterior to the flow surface downstream of the at least one structural component. The at least one suction duct comprises a suction opening facing away from the first end, wherein the suction opening is adapted for inducing a suction force into the at least one suction duct when the flow surface is exposed to an airstream during flight, thereby inducing a flow of air from through the openings to the suction opening.

The flow body of an aircraft is a component that comprises a flow surface, which is exposed to an airflow during flight of the aircraft. In the context of the invention the flow body is an exterior part that influences the aerodynamic characteristics of the aircraft. Inter alia, the flow body may be a wing, a part or a section of a wing, be it in a spanwise or chordwise direction, a part or a section of a tailplane, such as a vertical tailplane, a horizontal tailplane or components thereof. Also, the flow body may be an add-on body, which protrudes from a fuselage of the aircraft, a fairing, a wing, or a part of the tailplane, be it the horizontal or the vertical tailplane, into the surrounding of the aircraft. Depending on the overall design of the aircraft, still further different flow bodies may be considered and the following description should not be construed as limiting the flow body to any kind mentioned in the following.

The at least one structural component may preferably be a part of an interior main structure of the flow body, such as a spar or a stringer, for providing dimensional stability. Common design principles of aircraft and flow bodies thereof are based on the combination of a skin as a shape determining part and a support structure as an interior part. The support structure often comprises a set of structural components, which are arranged in a predetermined geometrical relationship and allow to create a lightweight and stiff three-dimensional body.

As stated above, the flow body comprises at least one perforated area having openings extending through the flow surface. Depending on the desired intensity of a boundary layer control measure, also a multitude of separate perforated areas may be considered. Each of the at least one perforated area comprises a set of openings, which may be arranged in a regular or irregular pattern or a combination thereof on the flow surface. Also, different patterns may be generated in a single perforated area. The openings may comprise a diameter that depends on the airflow conditions, the material of the flow body and the desired porosity and may extend through the flow surface perpendicularly or at an angle thereto that differs from a perpendicular extension.

The manifold acts as an interface or as a collection device for receiving the air flow that passes the openings into the interior of the flow body and for routing it into the at least one suction duct. The at least one suction duct, which is coupled with the manifold, induces a suction force on all openings at the same time. While the manifold may be or lead into a plenum chamber, it may also be realized in the form of a line section or, in other words, a feeder duct. In case the manifold is intended to be a plenum chamber, it may be created by simply providing a wall at a distance to the at least one perforated area in order to enclose a defined space in fluid communication with the at least one suction duct and the exterior of the openings. In this regard, providing a wall may be realized through using a part of a main structure, such as the at least one structural component of the flow body, or by installing a separate wall.

Locating the manifold upstream of the at least one structural component and placing the suction opening downstream of the at least one structural component requires the at least one suction duct extending over the at least one structural component along the flow surface to a region with a suitable pressure and flow condition for inducing a suction force. Hence, modifications of the at least one structural component are not required, since the at least one suction duct does not need to be routed through the at least one structural component. Resultantly, the flow body according to the invention is perfectly suitable for retrofit solutions to already existing aircraft, since a part of a flow body intended for an addition of a boundary layer control may be replaced by the flow body according to the invention without any further modifications.

The suction opening, which faces away from the first end of the at least one suction duct is placed in a low pressure area to generate a suitable pressure gradient between the porous surface and the suction opening, to primarily ensure the required mass flow and secondly by compensating also the pressure losses in the suction duct. The suction opening is flown over by with the airflow around or along the flow body. Depending on the shape and the orientation of the suction opening, the suction force, which is given as the low pressure at the second end multiplied with the cross-sectional area of the suction opening, may be influenced to match the desired airflow through the openings. Since the at least one suction duct is placed exterior to the flow surface, it is preferable to let it extend from the flow surface as little as possible to minimize an unavoidable parasitic drag. However, by optimizing the shape of the at least one suction duct the positive effect of the boundary layer control clearly overweighs its parasitic drag.

In an advantageous embodiment, the flow body further comprises a leading edge, which faces into the airflow during flight, wherein the at least one perforated area is created as a section of the flow surface extending over the leading edge. Exemplarily, a vertical or horizontal tail plane may be equipped with a partially perforated leading edge region, from which at least one suction duct extends in a downstream direction on the flow surface. Consequently, the front spar as a structural component of the flow body, which is further upstream, does not need to be modified as the at least one suction duct does not need to be routed through it.

In another advantageous embodiment, the at least one suction duct comprises a bifurcated arrangement of two suction ducts. Resultantly, the individual (effective) diameters of both suction ducts can be reduced, as two separate suction ducts commonly provide the suction force. Also, the parasitic drag induced by the two suction ducts occur symmetrically in relation to a flight direction and do not lead to a (very marginal) asymmetric forces on the aircraft.

Another advantage of the use of a bifurcated arrangement of two suction ducts lies in the capability to always provide a sufficient suction effect in the manifold even when a distinct side slip of the aircraft occurs, in which case a suction duct on one lateral side of the aircraft produces a much smaller suction force than the other one.

Preferably, the manifold is located between the leading edge of the flow body and a front spar as the at least one structural component of the flow body due to the above-mentioned reasons.

Depending on the type of flow body, a certain pressure field on the exterior surface is produced, which pressure field comprises at least one section having a local pressure lower than upstream of the at least one structural component, wherein the suction opening is located directly upstream of this section of low pressure. Preferably, a section having a minimum pressure is created on the exterior surface. By placing the suction opening into this location of low pressure, the suction force is further supported.

In another advantageous embodiment, the manifold extends substantially parallel to the front spar and the two suction ducts each comprise a bent section between the first end and a section, which is fully placed on the exterior side of the flow surface. This bent section allows to reach from the exterior side of the flow surface into the interior, directly upstream the at least one structural component.

In a preferred embodiment, the cross-sectional surface area of the bent section exceeds the cross-sectional surface area of the suction opening. Exemplarily, the cross-sectional surface area at the bent section may be at least 50% higher than that at the suction opening. It may also be particularly larger, such as at least twice the cross-sectional surface area at the suction opening. The pressure losses, which generally depend on the square of the flow velocity and certain other factors, in curved or bent ducts exceeds the pressure loss in a straight duct. The pressure loss may significantly be reduced by reducing the flow velocity, which is accomplished through increasing the cross-sectional surface area.

Increasing the cross-sectional surface area may be accomplished by widening the suction duct, which means that an extension of the suction duct away from the flow surface is substantially prevented, while a suction duct determining dimension substantially parallel to the flow surface is increased. Hence, the cross-sectional surface of the bent section extends on a wider dimension on the flow surface than the cross-sectional surface of the suction opening This further leads to reducing the parasitic drag induced by the outer dimensions and shape of the suction duct.

In a particularly advantageous embodiment the at least one suction duct comprises a cross section, which is at least partially crescent-shaped.

The at least one suction duct continuously tapers of from a cutout in the flow body, through which the at least one suction duct extends from an interior to an exterior side, to the suction opening. In a region including the cutout the at least one suction duct may be bent, i.e. it comprises a bent section.

In a still further advantageous embodiment, the flow body comprises a flow control means, which is adapted for reducing the flow between the manifold and the at least one suction duct selectively. Reduction or elimination of a flow between the manifold and the at least one suction duct leads to switching on, reducing or switching off the boundary layer control. This may be helpful in flight phases other than cruise phases, thereby, reducing the danger of contamination, i.e. clogging of the openings. The flow control means may be placed at or in the manifold and may comprise an aperture, an orifice, a movable flap or other common devices for influencing an air flow through a duct.

As stated above, a space between the perforated area and the at least one structural component may at least partially be closed interior of the flow body so as to form a plenum chamber in which the at least one manifold may be placed, which is connected to the manifold or which constitutes the manifold.

Overall, the flow body according to the invention allows to induce a suction force onto at least one suction duct in fluid communication with openings of at least one perforated area, without the necessity to modify a primary structure in the flow body. Routing the at least one suction duct on the exterior flow surface allows to tap a point of lowest pressure, which supports the generation of a suction force.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
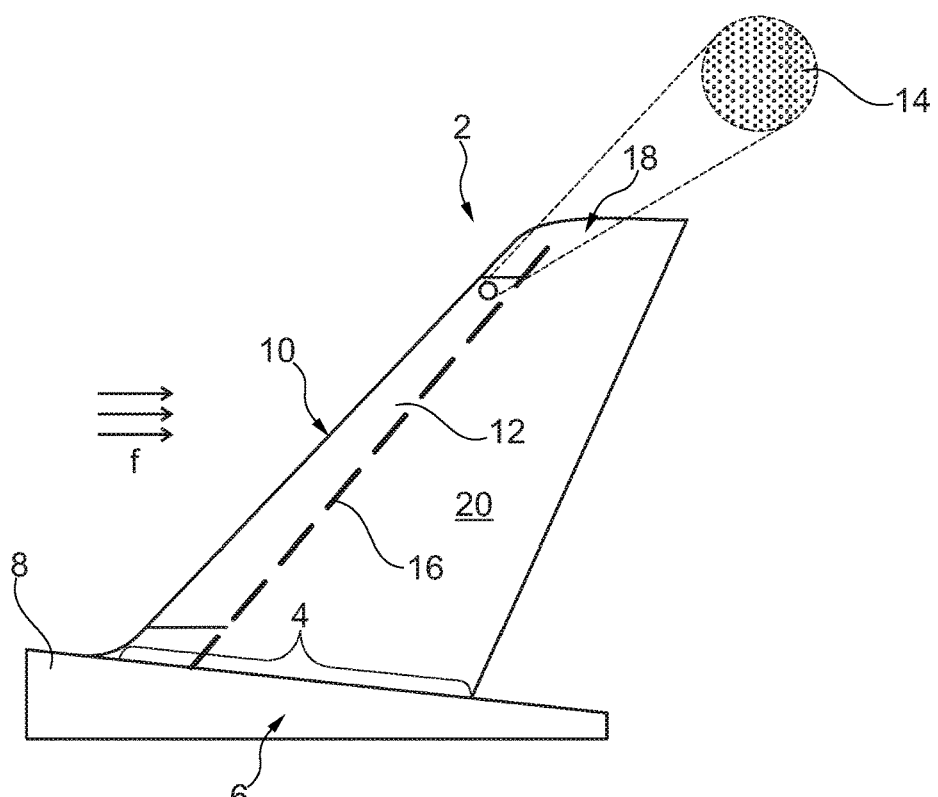
FIG. 1 shows a flow body in the form of a vertical tail plane having a suction area.

In FIG. 1, a flow body 2 in the form of a vertical tailplane is depicted. The flow body 2 comprises a base 4, which adjoins a tail section 6 of a fuselage 8 of an aircraft. The flow body 2 comprises a leading edge 10 that faces the airflow, which is indicated with arrows "f". Starting from the leading edge 10, a perforated area 12 extends to both sides of the flow body 2 in a downstream direction. For the sake of simplification, the perforated area 12 may be considered a curved polygon, e.g. a rectangle or slightly tapered surface covering the leading edge 10 having a multitude of openings 14.

The openings 14 may be arranged in a regular and/or irregular pattern. Also, the perforated area 12 may be segmented into a multitude of separate perforated areas, depending on the intended volume flow at various locations on the flow body 2. The openings 14 allow air to pass through a flow surface 20, which is the outer surface of the flow body 2, to be drawn into an interior of the flow body 2 out of a boundary layer created on the flow surface 20.

Indicated with a dashed line, a front spar 16 extends from the base 4 to a tip portion 18 of the flow body 2. Further spars may be arranged inside the flow body 2, which are not depicted for simplification. A skilled person will be readily able to provide a sufficiently stiff support structure having one or more structural components for using the flow body 2 in the desired conditions. The front spar 16 is a structural component, which is located at a most forward or upstream position in the flow body 2. Further upstream, the perforated area 12 is placed, which substantially extends over a leading edge area covering the region between the front spar 16 and the leading edge 10. By removal of air through the openings 14, the flow in the boundary layer on this leading edge region is at least partially laminar.

Figure 2:
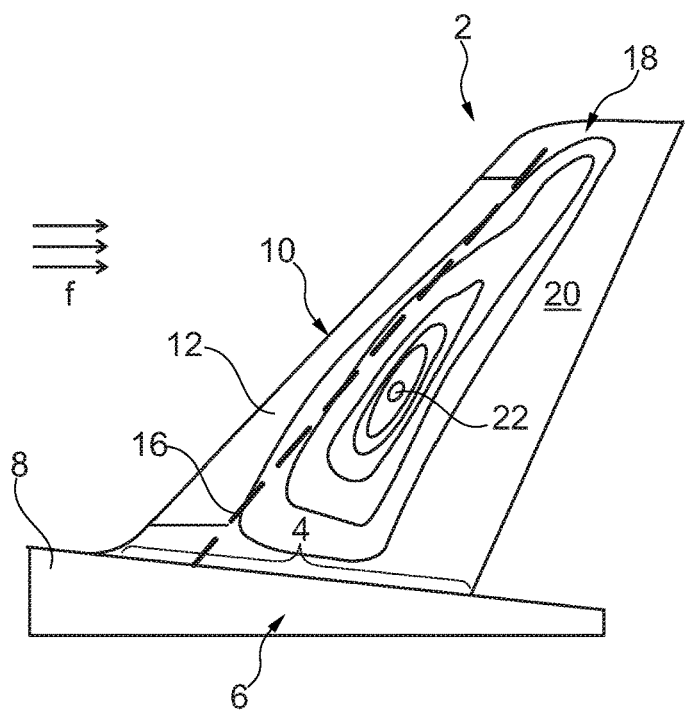
FIG. 2 shows the flow body with isobars indicating an exemplary pressure distribution field.
Figure 3:
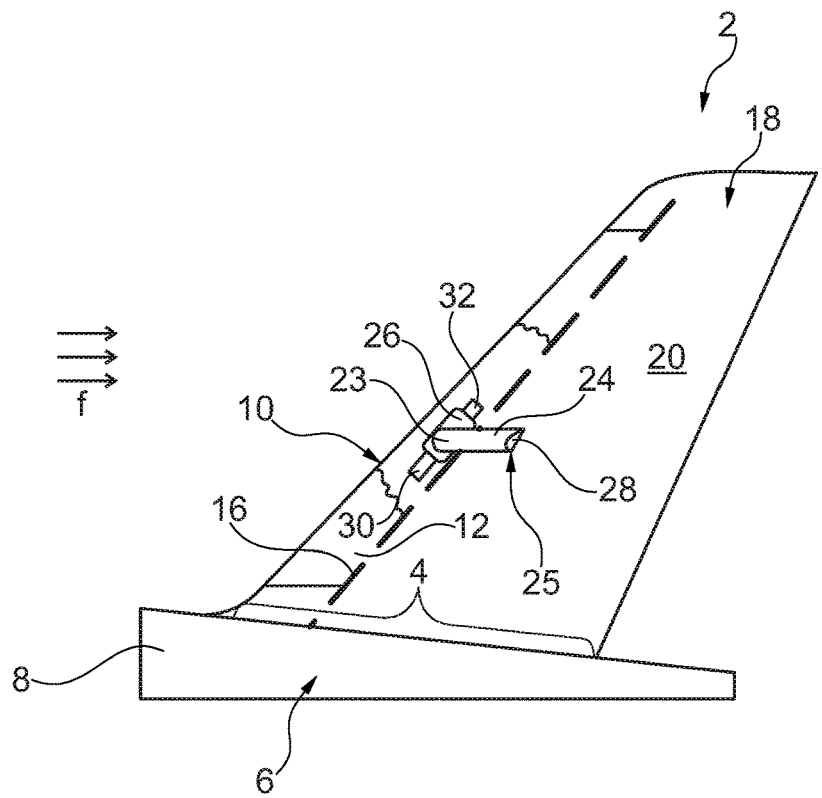
FIG. 3 shows the same flow body with a manifold and a suction duct attached thereto.

Depending on the intended flight parameters of the aircraft, e.g. the speed and altitude, the influences of other flow bodies further upstream, and other factors, a certain pressure distribution is generated on the flow surface 20. FIG. 2 exemplarily shows the flow body 2 of FIG. 1 with a schematic isobar plot of a pressure field, which is generated during flight. Here, several exemplary isobar lines each show an equal or constant pressure on the flow surface 20. In the pressure field there may be a region of lowest pressure 22, which is located downstream the front spar 16. A suction duct extending between this region of lowest pressure 22 and a location interior of the perforated area 12 having a higher pressure, a suction force is initiated. This will be explained with following FIG. 3.

FIG. 3 again shows the same flow body 2 as in FIGS. 1 and 2 and shows a partially sectional view with a suction duct 24, which extends from a manifold 26, which is placed between the front spar 16 and the leading edge 10, and a location 28 just upstream the region of lowest pressure 22. The suction duct runs on an exterior side of the flow surface 20 and thereby passes the front spar 16 without having to reach through it. This means that no installation space inside the flow body is required for including the suction duct 24 and its extension to the region of lowest pressure 22. Since only one side of the flow body 2 is depicted the other (hidden) side of the flow body 2 may also comprise such a suction duct 24 extending from the manifold 26 in a symmetrical manner. However, this is not necessary and a skilled person may only provide a single suction duct 24 if desired.

The suction duct comprises a first end 23 and a second end 25. While the first end 23 is connected to the manifold 26, the second end 25 comprises a suction opening 28, which faces away from the first end 23 and the leading edge 10, respectively. The manifold 26, which is arranged substantially parallel to the leading edge 10, here resembles an interface between the suction duct 24 and two inlets 30 and 32, which feed air that passes the perforated area 12 into the manifold 26. Both inlets 30 and 32 are designed as line sections, which are exemplarily extending parallel to the leading edge 10 and which each are open to a side facing away from the manifold 26. The space enclosed by the perforated area 12 and limited by the front spar 16 may be closed in order to create a plenum chamber, which receives air that passes through the openings 14, which air is then drawn into the suction duct 24. The whole arrangement allows to provide a fluid coupling between the openings 14 in the leading edge region and the suction duct 24.

Figure 4:
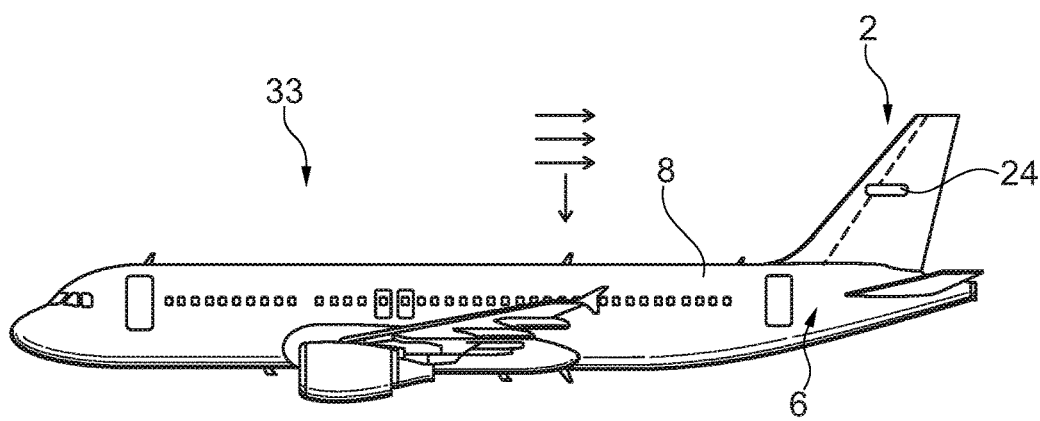
FIG. 4 shows an aircraft having a flow body according to the invention.

FIG. 4 shows an aircraft 33, which more illustratively depicts the arrangement of the flow body 2 in the form of a vertical tailplane at a tail section 6 of the fuselage 8 as well as an exemplary location and dimensional extension of the suction duct 24.

Figure 5:
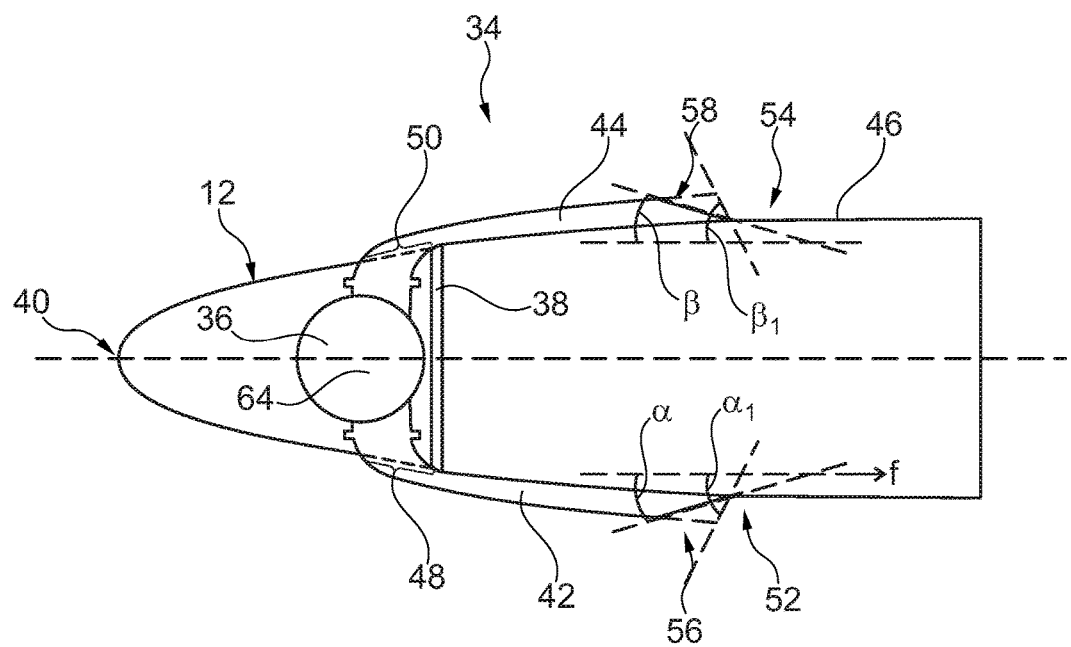
FIG. 5 shows a top view on a cross-section of a flow body having a bifurcated arrangement of two suction ducts.

FIG. 5 shows a more detailed and less schematic design of a part of a flow body 34 in an exemplary embodiment. Here, a top view on a cross-section of the flow body 34 is shown, which comprises a manifold 36 between a front spar 38 and a leading edge 40, to which manifold 36 a bifurcated arrangement of two suction ducts 42 and 44 is connected. Both suction ducts 42 and 44 comprise a first end 41 and 45, respectively, and a second end 43 and 47, respectively. It is clearly apparent that a flow surface 46 of the flow body 34 requires two cutouts 48 and 50, through which the suction ducts 42 and 44 extend. From the cutouts 48 and 50, which are placed just upstream the front spar 38, the suction ducts 42 and 44 extend further downstream and run alongside the exterior of the flow surface 46.

At a location just upstream a point of minimum pressure 52 and 54, the suction ducts 42 and 44 have a suction opening 56 and 58, respectively, which faces away from the leading edge 40 and the manifold 36. Exemplarily, the cross-sectional surfaces of the openings 56 and 58 each enclose an angle $\alpha$ and $\beta$, which are less than 90° to the streamline of the surrounding airstream. As indicated with $\alpha 1$ and $\beta 1$, the angles of the cross-sectional surfaces of the openings 56 and 58 may also be distinctly higher, depending on the optimisation of the overall design of the flow body 34. The low static pressure due to the air flow around the flow body is the main driver for the pressure difference between the regions of lowest pressure 52 and 54 and the manifold 36 supports the suction.

Figure 6:
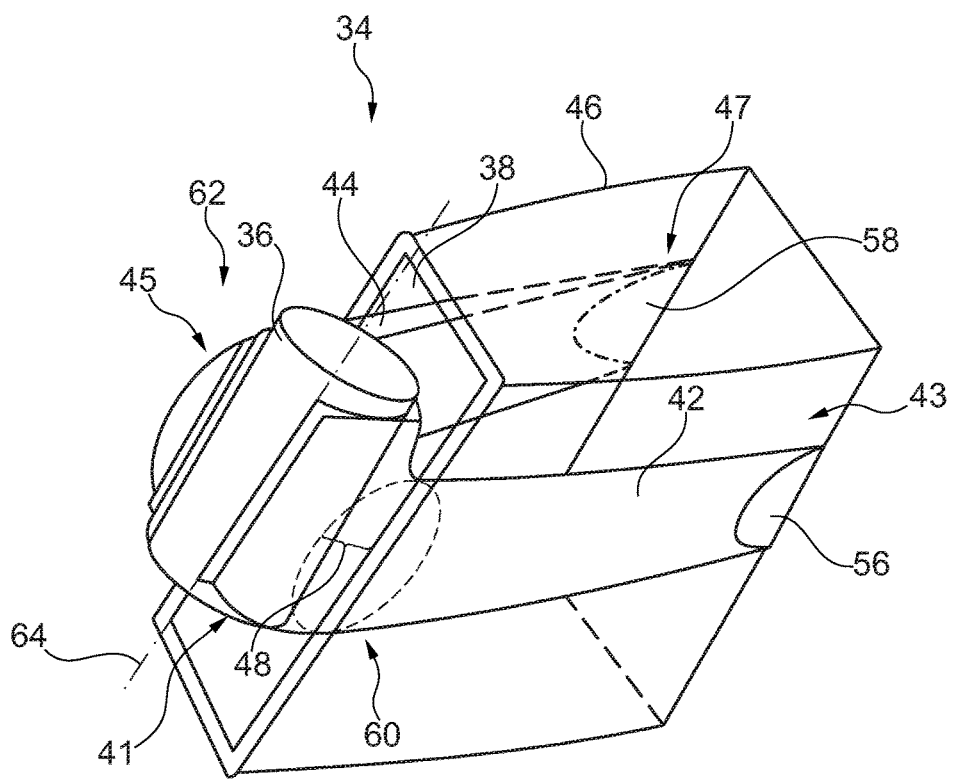
FIG. 6 shows a three-dimensional view on a detail of the bifurcated arrangement of two suction ducts of FIG. 5.

FIG. 6 shows a three-dimensional drawing of a part of the flow body 34 of FIG. 5 to illustrate a possible shape of the local cross-sectional surfaces of the suction ducts 42 and 44.

In order to reduce the parasitic drag, which is unavoidable for any exterior part added to the flow surface 46, the extension away from the flow surface 46 is minimised through providing a crescent shape. Further, due to conducting a detour or diversion around the front spar 38, both suction ducts 42 and 44 require a bent section 60 and 62. In these, the air flow changes its direction about approximately 90 degrees, which would lead to an additional pressure loss, depending on the flow velocity. By widening the cross-sectional surface around the bent sections 60 and 62, the flow velocities can be minimised, such that the additional pressure loss in the bent sections 60 and 62 can be minimised. This asks for some optimization, since wider ducts interfere more with the external flow, hence create more parasitic drag.

The manifold 36 may be realized as depicted, i.e. through simply providing a rather short duct section, which is open to both sides, wherein a longitudinal axis 64 of the manifold 36 runs parallel to the front spar 38. Both suction ducts 42 and 44 are connected to the manifold 36 substantially perpendicular to the longitudinal axis 64. Furthermore, the local cross-sectional surface areas of both suction ducts 42 and 44 may decrease along the course from the bent area 60 or 62 to the suction opening 56 or 58 continuously, e.g. by narrowing the extension on the flow surface 46. As stated before, a trade-off between the parasitic drag and the positive effects of the boundary layer control has to be done based on the boundary conditions of the respective aircraft for providing a detailed design of the suction ducts 42 and 44.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flow body of an aircraft, comprising:
   a flow surface exposed to an airstream during flight of the aircraft;
   at least one structural component attached to an interior of the flow surface;
   at least one perforated area comprising a plurality of openings extending through the flow surface;
   a manifold positioned interior to the flow surface in fluid communication with the openings and upstream of the at least one structural component; and
   at least one suction duct having a first end and a second end, the first end in fluid communication with the manifold and the second end placed exterior to the flow surface downstream of the at least one structural component, the at least one suction duct running on an exterior side of the flow surface,
   wherein the at least one suction duct comprises a suction opening facing away from the first end, and
   wherein the suction opening is adapted for inducing a suction force into the at least one suction duct when the flow surface is exposed to an airstream during flight, thereby inducing a flow of air from through the openings to the suction opening.

2. The flow body of claim 1, further comprising a leading edge facing into the airflow during flight, wherein the at least one perforated area is created as a section of the flow surface extending over the leading edge.

3. The flow body of claim 2, wherein the manifold is located between the leading edge of the flow body and a front spar as the at least one structural component of the flow body.

4. The flow body of claim 1,
   wherein a certain pressure field on the flow surface is produced, the pressure field comprising at least one region having a local pressure lower than upstream of the at least one structural component, and
   wherein the suction opening is located directly upstream of the at least one region of lower pressure.

5. The flow body of claim 1, wherein the at least one suction duct comprises a bifurcated arrangement of two suction ducts.

6. The flow body of claim 5,
   wherein the manifold extends substantially parallel to the at least one structural component, and
   wherein the two suction ducts each comprise a bent section between the first end and a section, which is fully placed on the exterior side of the flow surface.

7. The flow body of claim 6, wherein the cross-sectional surface area of the bent section exceeds the cross-sectional surface area of the suction opening.

8. The flow body of claim 1, wherein the at least one suction duct comprises a cross section, which is crescent-shaped.

9. The flow body of claim 1, wherein the at least one suction duct continuously tapers off from a cutout in the flow body, through which the at least one suction duct extends from an interior to an exterior side, to the suction opening.

10. The flow body of claim 1, wherein the manifold comprises at least one inlet extending into a space formed between the leading edge and the at least one structural component.

11. The flow body of claim 1, further comprising a flow control means adapted for reducing the air flow between the manifold and the at least one suction duct selectively.

12. The flow body of claim 1, wherein the flow body is configured as a vertical tailplane or a horizontal tailplane, wherein the perforated area is arranged in the region of a leading edge of the flow body.

13. The flow body of claim 1, wherein a space between the perforated area and the at least one structural component is at least partially closed interior of the flow body so as to form a plenum chamber.

14. An aircraft having a fuselage and a flow body comprising:
   a flow surface exposed to an airstream during flight of the aircraft;

at least one structural component attached to an interior of the flow surface;

at least one perforated area comprising a plurality of openings extending through the flow surface;

a manifold positioned interior to the flow surface in fluid communication with the openings and upstream of the at least one structural component; and at least one suction duct having a first end and a second end, the first end in fluid communication with the manifold and the second end placed exterior to the flow surface downstream of the at least one structural component, the at least one suction duct running on an exterior side of the flow surface, wherein the at least one suction duct comprises a suction opening facing away from the first end, wherein the suction opening is adapted for inducing a suction force into the at least one suction duct when the flow surface is exposed to an airstream during flight, thereby inducing a flow of air from through the openings to the suction opening.

15. The aircraft of claim 14, wherein the flow body is a vertical tailplane.

\* \* \* \* \*